United States Patent
Milanese et al.

(10) Patent No.: US 10,602,412 B2
(45) Date of Patent: Mar. 24, 2020

(54) MANAGEMENT OF VOICE CONVERSATIONS WITH SWITCHING AMONG DIFFERENT COMMUNICATION TECHNIQUES

(71) Applicant: International Business Machines Corporation, Armonk, NY (US)

(72) Inventors: Nicola Milanese, Rome (IT); Stefano Sidoti, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/346,473

(22) Filed: Nov. 8, 2016

(65) Prior Publication Data

US 2018/0132151 A1    May 10, 2018

(51) Int. Cl.
*H04W 36/30* (2009.01)
*H04W 36/14* (2009.01)
(Continued)

(52) U.S. Cl.
CPC ........... *H04W 36/14* (2013.01); *H04W 36/30* (2013.01); *H04W 36/36* (2013.01); *H04W 4/023* (2013.01); *H04W 4/10* (2013.01); *H04W 36/32* (2013.01)

(58) Field of Classification Search
CPC ..... H04W 36/12; H04W 36/14; H04W 36/18; H04W 36/34; H04W 36/36; H04W 36/30;
(Continued)

(56) References Cited

U.S. PATENT DOCUMENTS 7,539,505 B2   5/2009   Wajda et al.
8,019,383 B2   9/2011   Kossi et al.
(Continued)

FOREIGN PATENT DOCUMENTS

WO   2009052859 A1   4/2009

OTHER PUBLICATIONS

Enhanced Push-to-Talk: Quickly connect employees, applications and business practices; https://www.business.att.com/enterprise/Family/mobility-services/enhanced-push-to-talk/#fbid=yOMU3.
(Continued)

*Primary Examiner* — Un C Cho
*Assistant Examiner* — Lalita W Pace
(74) *Attorney, Agent, or Firm* — Michael A. Petrocelli

(57) ABSTRACT

Systems and methods are provided for establishing a voice conversation between a first user of a first telephone terminal and a second user of a second telephone terminal by using a current communication technique of a plurality of communication techniques supported by the first telephone terminal and the second telephone terminal, monitoring one or more quality indicators of the current communication technique, and switching the voice conversation from the current communication technique to a selected one of the other communication techniques different from the current communication techniques in response to a switching condition based on the quality indicators of the current communication technique and on one or more quality indicators of each one of the other communication techniques.

19 Claims, 9 Drawing Sheets

(51) Int. Cl.
*H04W 36/36* (2009.01)
*H04W 4/10* (2009.01)
*H04W 4/02* (2018.01)
*H04W 36/32* (2009.01)

(58) Field of Classification Search
CPC ....... H04W 36/32; H04W 4/10; H04W 4/023; H04W 4/04; H04W 4/043; H04W 4/046; H04W 88/06; H04W 4/16; H04B 17/309; H04B 17/318
See application file for complete search history.

(56) References Cited

U.S. PATENT DOCUMENTS

| | | | | |
|---|---|---|---|---|
| 8,180,386 | B1* | 5/2012 | Delker | H04M 1/274516 |
| | | | | 370/401 |
| 8,406,684 | B1 | 3/2013 | Yeh et al. | |
| 8,588,760 | B2 | 11/2013 | Esseling | |
| 8,681,663 | B2 | 3/2014 | Fraser | |
| 8,693,434 | B2* | 4/2014 | Sinnreich | H04L 12/2854 |
| | | | | 370/331 |
| 8,929,938 | B2 | 1/2015 | Koren et al. | |
| 9,118,393 | B2 | 8/2015 | Overduin et al. | |
| 2004/0023652 | A1* | 2/2004 | Shah | H04W 48/18 |
| | | | | 455/426.2 |
| 2005/0111432 | A1* | 5/2005 | Ekstrom | H04L 65/4061 |
| | | | | 370/350 |
| 2005/0180394 | A1* | 8/2005 | Kautz | H04L 12/5692 |
| | | | | 370/352 |
| 2006/0040685 | A1* | 2/2006 | Kwon | H04W 4/10 |
| | | | | 455/507 |
| 2006/0148502 | A1* | 7/2006 | Korneluk | H04W 76/23 |
| | | | | 455/518 |
| 2007/0249393 | A1* | 10/2007 | Sittler | H04B 1/005 |
| | | | | 455/553.1 |
| 2009/0285175 | A1* | 11/2009 | Nix | H04L 29/125 |
| | | | | 370/331 |
| 2011/0201347 | A1* | 8/2011 | Abraham | H04W 48/18 |
| | | | | 455/456.1 |
| 2014/0185587 | A1* | 7/2014 | Jang | H04W 36/0005 |
| | | | | 370/331 |
| 2014/0213221 | A1* | 7/2014 | Chai | H04W 72/0493 |
| | | | | 455/411 |
| 2015/0358834 | A1* | 12/2015 | Cronin | H04W 24/02 |
| | | | | 455/452.1 |
| 2016/0234749 | A1* | 8/2016 | Singh | H04W 36/0022 |
| 2017/0339535 | A1* | 11/2017 | Mazzarella | H04W 4/10 |
| 2018/0092026 | A1* | 3/2018 | Patel | H04L 1/0001 |

OTHER PUBLICATIONS

"Push-to-talk", Wikipedia, the free encyclopedia, Jun. 17, 2015, Internet Archive Wayback Machine, 4 pages, <https://web.archive.org/web/20150617130026/https://en.wikipedia.org/wiki/Push-to-talk>.

"Push-To-Talk", Mobile Tornado, May 31, 2015, retrieved from the Internet Archive Wayback Machine, 1 page, <https://web.archive.org/web/20150531083438/http://www.mobiletornado.com/Push-To-Talk.html>.

"The Info List—Push To Talk", retrieved from the Internet Apr. 14, 2016, 5 pages, <http://theinfolist.com/php/SummaryGet.php?FindGo=Push_to_talk>.

"Two Way Radio Phone, Walkie Talkie Intercom Phone Vefone", BABIKEN, Jan. 3, 2015, retrieved from the Internet Archive Wayback Machine, 2 pages, <http://www.babikenshop.com/two-way-radio-phone-walkie-talkie-intercom-phone-vefone-t900-p-797.html>.

"Two-way radio", Wikipedia, the free encyclopedia, May 24, 2015, Internet Archive Wayback Machine, 13 pages, <https://web.archive.org/web/20150524215722/http://en.wikipedia.org/wiki/Two-way_radio>.

Pillai et al., "Optimizations for Push-To-Talk in Wireless Networks Efficient—Management of Call Setup Latency", 2009 Third International Conference on Next Generation Mobile Applications, Services and Technologies, pp. 137-142, DOI 10.1109/NGMAST.2009.37.

* cited by examiner

MANAGEMENT OF VOICE CONVERSATIONS WITH SWITCHING AMONG DIFFERENT COMMUNICATION TECHNIQUES

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the management of voice conversations.

Voice conversations are the most common form of communication, thanks to their interactive and spontaneous nature.

For this purpose, telephones routinely engage in voice communications or conversations remotely by means of telephone calls, without the need of meeting physically. Particularly, mobile telephones allow their users to perform the telephone calls while moving around by a (voice) connection with a mobile telephone network. Users of (mobile) telephones separated by vast distances engage in conversations thanks to the almost unlimited range of the mobile telephone network.

However, the telephone calls may be not possible when at least one of the involved telephones is unable to connect with the mobile telephone network. For example, users are unable to connect with the mobile telephone network when the mobile telephone network is not present; a structure prevents the connection with the mobile telephone network (such as within a tunnel), or the mobile telephone network is too congested. Moreover, the telephone calls may have a cost (for example, in case of pay-per-use telephone plans for voice traffic or abroad), that some users seek to avoid.

Walkie-talkies, or handheld transceivers (HTs), also enable remote conversations by means of direct radio communications. The walkie-talkies operate in a half-duplex way, wherein every walkie-talkie may transmit audio information to the others at the time (with the walkie-talkies that are normally in receive mode and they are switched into transmit mode by pressing a dedicated button). The walkie-talkies are always available within their transmission range and they may be used to perform conversations substantially instantaneously (because it is enough to push the button without having to dial any telephone number); moreover, the radio communications do not have any cost.

However, the radio communications may be not possible when the walkie-talkies are too far away (i.e., their distance exceeds the corresponding transmission range, for example, of the order of a few kilometers).

Some telephones also provide a Push To Talk (PTT) function that mimics operation of the walkie-talkies, also known as Push-to-talk over cellular (PoC).

For example, a service offered over the Internet implements PTT functionality (accessed by either a data connection with the mobile telephone network or a Wi-Fi connection to access points). The PTT functionality accessed through the Internet may be used to performed conversations substantially instantaneously (like the walkie-talkies) and with users that are substantially everywhere (like the telephone calls); moreover, the conversations may have no cost (for example, in case of flat telephone plans for data traffic).

However, the conversations using the PTT function over the Internet may be not possible when the access to the Internet is not available for at least one of the involved telephones; moreover, the use of the PTT function may cause the reaching of a possible limit of the flat telephone plans.

Alternatively, the PTT function may be implemented by dedicated radio signals. Like the walkie-talkies, the PTT function over dedicated radio signals is always available with its transmission range, it may be used to perform conversations substantially instantaneously and it has no costs, but the corresponding radio communications may be not possible when the telephones are too far away.

For example, U.S. Pat. No. 7,539,505 discloses a Push-to-Talk (PTT) based communication service, the service dynamically creating a PTT group. U.S. Pat. No. 4,806,684 discloses a two-way radio device with combined mobile communication function that comprises at least a radio transceiver module and a 2G/3G transceiver module.

SUMMARY

In a particular implementation, a method for managing voice conversations establishes a voice conversation, using a first phone terminal, between a first user of a first telephone terminal and a second user of a second telephone terminal using current communication technique selected from a plurality of communication techniques supported by the first telephone terminal and the second telephone terminal. The method monitors one or more quality indicators of the current communication technique and one or more quality indicators of at least one other of the plurality of communication techniques. The method switches the voice conversation from the current communication technique to a selected one of the other communication techniques different from the current communication techniques in response to a switching condition based on the quality indicators of the current communication technique and the one or more quality indicators of the at least one other communication techniques.

In a particular implementation, the present invention is directed to a system for managing voice conversations. The system includes a voice management device configured to establish a voice conversation between a first user of a first telephone terminal and a second user of a second telephone terminal by using a current communication technique of a plurality of communication techniques supported by the first telephone terminal and the second telephone terminal. The voice management device monitors one or more quality indicators of the current communication technique and switches the voice conversation from the current communication technique to a selected one of the other communication techniques different from the current communication techniques in response to a switching condition based on the quality indicators of the current communication technique and on one or more quality indicators of each one of the other communication techniques.

In a particular implementation, the present invention is directed to a telephone terminal. The telephone terminal includes a circuitry for establishing a voice conversation between a user of the telephone terminal and a user of a second telephone terminal using one of a plurality of communication techniques supported by the telephone terminal and the second telephone terminal, circuitry for monitoring one or more quality indicators of the current communication technique, and circuitry for switching the voice conversation from the current communication technique to a selected one of the other communication techniques different from the current communication techniques in response to a switching condition based on the quality indicators of the current communication technique and on one or more quality indicators of each one of the other communication techniques.

DETAILED DESCRIPTION

FIGS. 1A-1E illustrate the general solution according to an embodiment of the present disclosure.

Figure 1A:
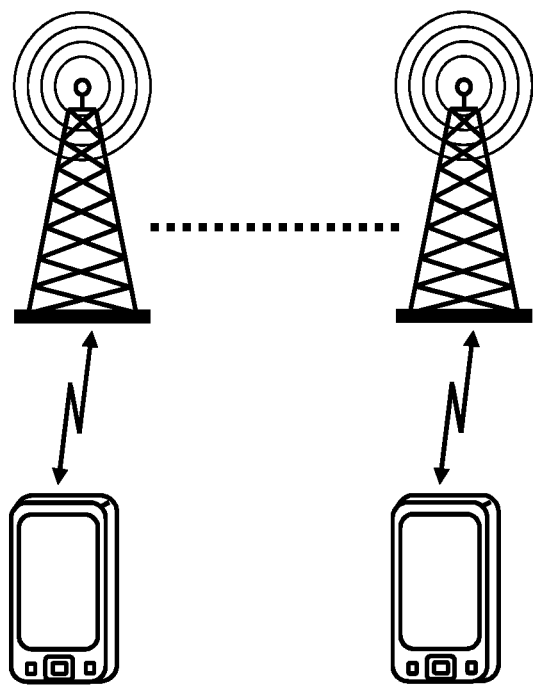
FIG. 1A provides an arrangement of elements in accordance with one aspect of the present disclosure.

Starting from FIG. 1A, a voice connection, or simply conversation, is established between the users of two telephone terminals, or simply telephones, so as to allow to speak to one another using the telephone terminals. The telephones support a plurality of communication protocols and techniques, and facilitate conversations by and among their users. For example, the communication techniques include a mobile telephone communication technique that connects telephones with a mobile telephone network and a Push-To-Talk (PTT) communication technique that connects telephones to one another using a direct radio connection. Using one of the communication techniques available to the telephones, a conversation is established. For example, a mobile telephone communication protocol establishes a telephone call link between the telephones.

Figure 1B:
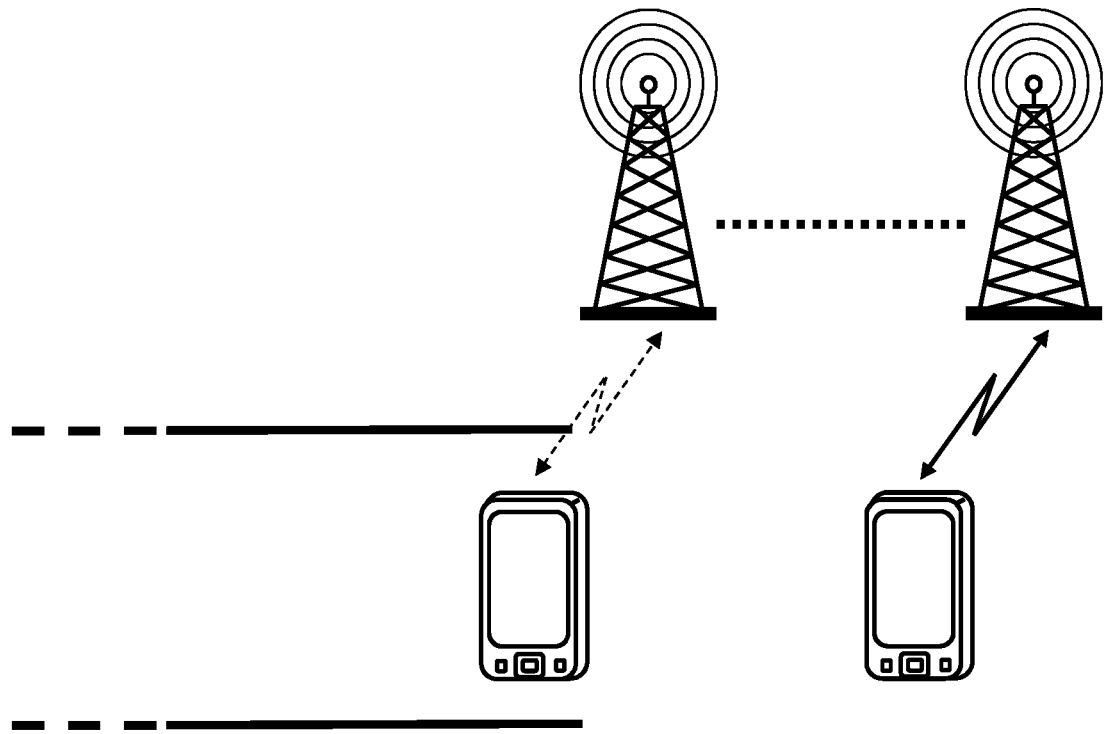
FIG. 1B provides a further arrangement of elements in accordance with one aspect of the present disclosure.

Moving to FIG. 1B, one of the telephones, or a communication server, monitors the one or more quality indicators of the current communication technique. In one implementation, the strength of the communication link between the telephone and one or more mobile telephone networks is periodically measured. The telephone, through one of more code executions, verifies a switching condition. The switching condition relates to the quality indicators of the current communication technique and one or more quality indicators of each of the communication techniques (i.e., the push to talk communication technique). In one implementation, the quality indicators of the push to talk communication technique correspond to the distance between the telephone receivers or the possibility of performing a radio communication between them. For example, the switching condition is present when a trend line or extrapolation of any signal strength indicates a risk of interruption of the conversation and at the same time, the distance of the telephones allows their radio communication. Such an occurrence is likely when two users are travelling in different cars along a highway (either in the same or opposite directions) and one of the cars approaches a tunnel.

Figure 1C:
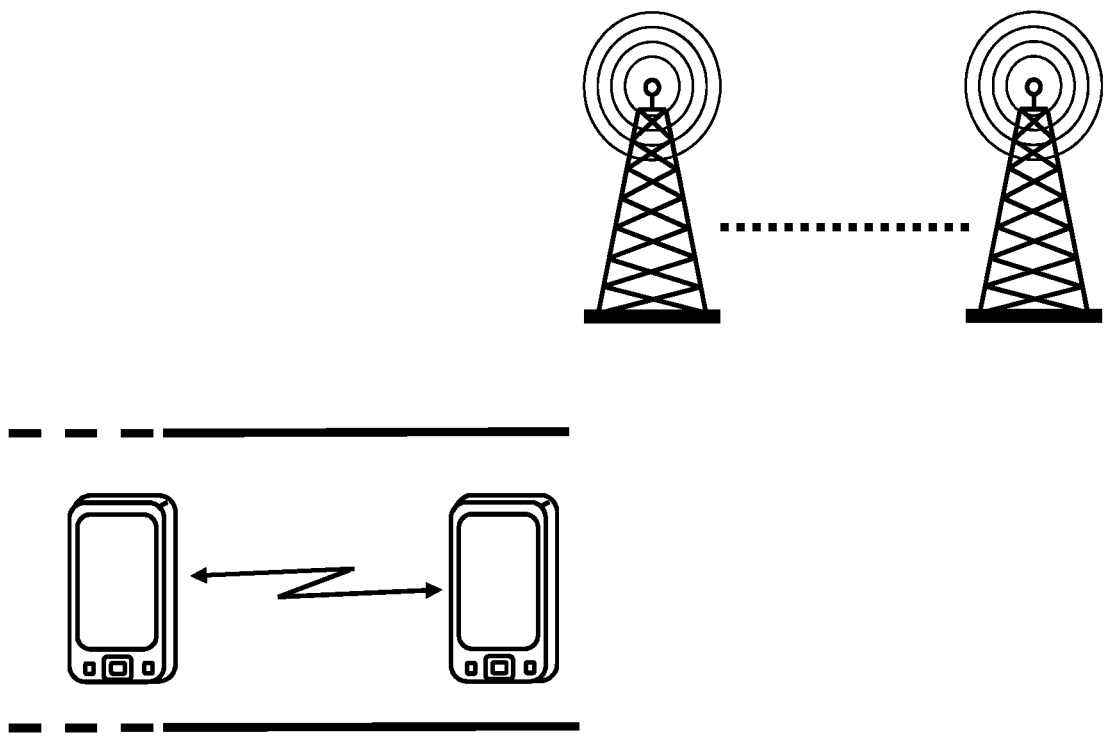
FIG. 1C provides a further arrangement of elements in accordance with one aspect of the present disclosure.

Moving to FIG. 1C, the conversation is switched from the current communication technique to a selected one of the other communication techniques (i.e., always the push to talk communication technique in this case) in response to the switching condition. In one implementation, the telephone(s) drops or terminates the previously initiated radio communication. Thus, the conversation may continue (using the radio communication) even if the telephone call is not possible any longer using the first communication protocol. For example, the telephones maintain communication with one another even when the one or more of the cars they are located in move into a tunnel.

Figure 1D:
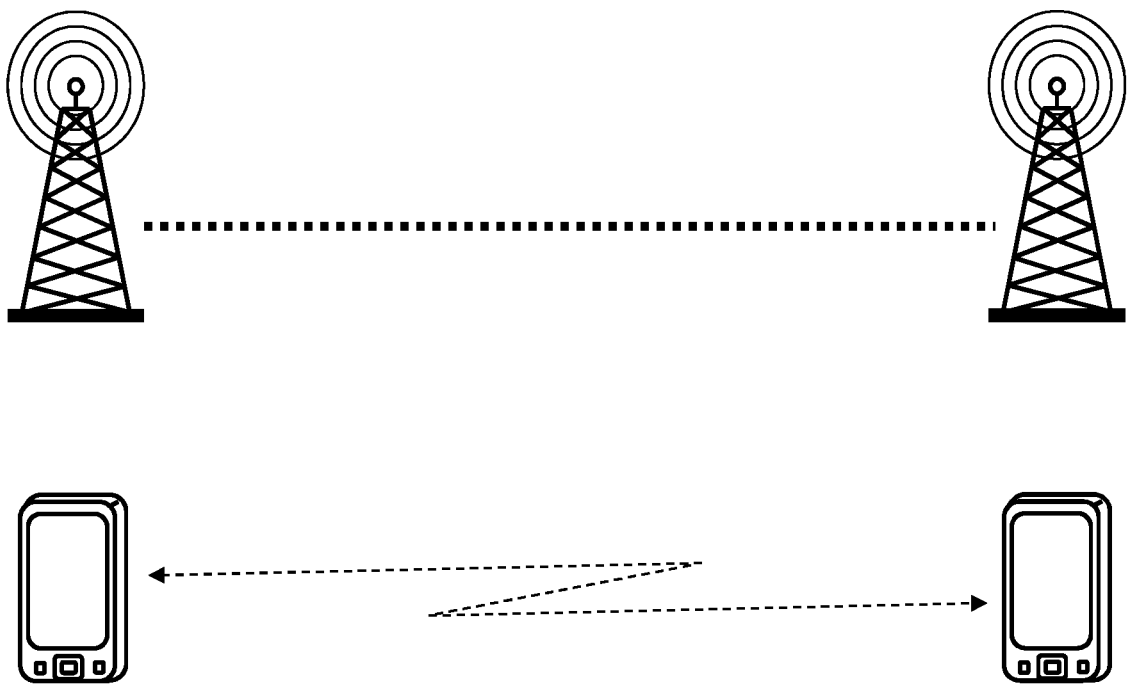
FIG. 1D provides a further arrangement of elements in accordance with one aspect of the present disclosure.

With reference to FIG. 1D, one of the telephones, or a communication server, monitors the quality indicators of the (new) current communication technique (for example, the distance of the telephones). A switching condition is then verified, again based on the quality indicators of the current communication technique and of each other communication technique, i.e., the mobile telephone communication technique (for example, the signal strength of the telephones). For example, the switching condition is present when a trend of the distance of the telephones indicates a risk of interruption of the conversation and at the same time, the signal strengths of the telephones allow a telephone call between them; such as when two employees of a same company move away from one another.

Figure 1E:
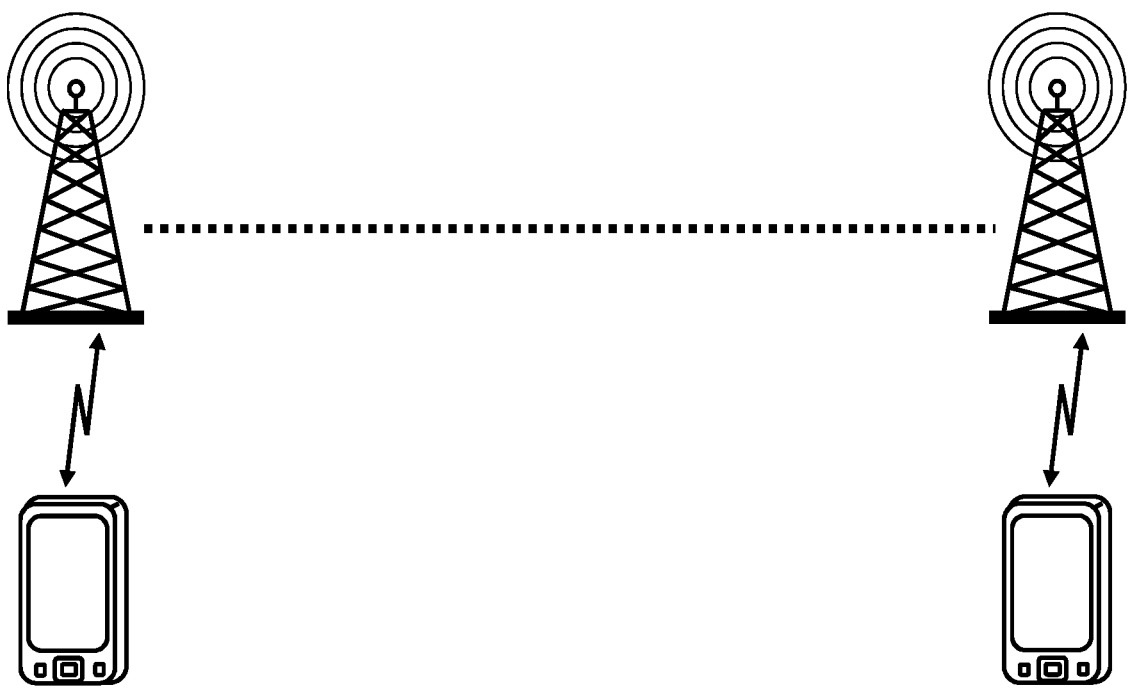
FIG. 1E provides a further arrangement of elements in accordance with one aspect of the present disclosure.

Moving to FIG. 1E, as above the conversation is switched from the current communication technique to a selected other communication techniques (i.e., from a mobile telephone communication technique in to a PPT technique in the provided example) in response to the switching condition. For example, one telephone, or communication server, initiates a connection between the telephones and then the established radio connection between the telephones is disconnected. Therefore, the conversation may continue (using the telephone call) even if the radio communication is not possible any longer (for example, when the employees are too spaced apart).

The above-described solution allows maintaining the conversation even when one or more communication techniques become not available. For example, the conversation using the mobile telephone communication technique may continue even when the telephones are unable to connect with the mobile telephone network. Such protocol switching occurs, for instance, when one or more of the participants of the call are no longer within mobile telephone network range, or when a structure prevents a connection with the mobile telephone network or the mobile telephone network is congested). Likewise, a conversation using push to talk communication protocol may continue even when the telephones become too far away.

Figure 2:
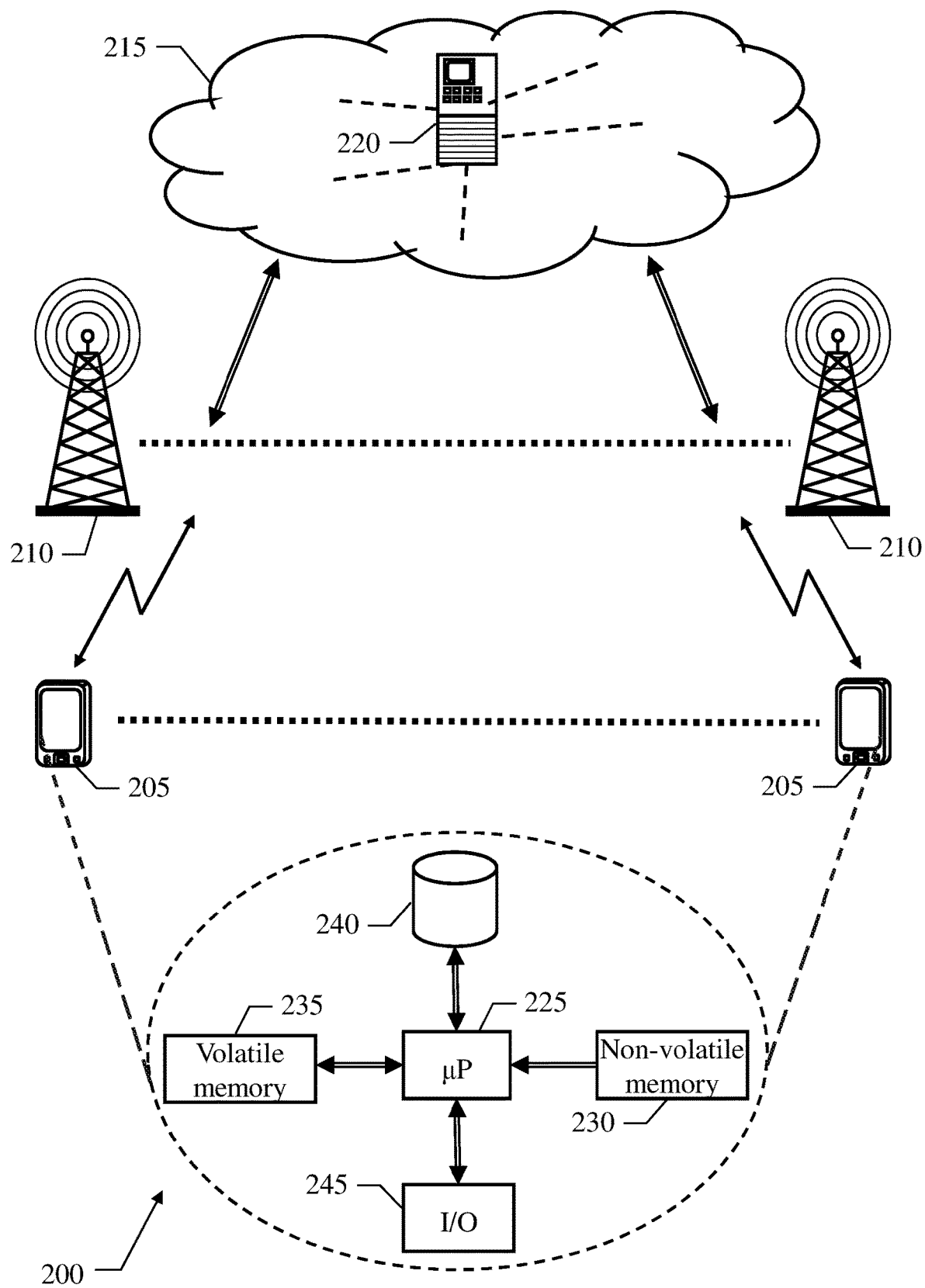
FIG. 2 provides a schematic block diagram of an infrastructure wherein the solution according to an embodiment of the present disclosure may be practiced.

FIG. 2, provides a schematic block diagram detailing an infrastructure 200 comprising a number of telephones 205 (for example, smartphones). Here, each telephone 205 has a corresponding telephone number (or more) stored in a SIM card that is plugged in the telephone 205. In one implementation, the telephones 205 communicate via radio signals (for example, in the UHF spectrum) with a mobile telephone network 210 that allows users of the telephones 205 to exploit services offered by mobile telephone operators of their telephone numbers (subscribed thereto). In a particular implementation, the telephone operators provide voice and data connections used by the telephones 205 to initiate and participate in telephone calls among their users and to exchange (i.e., download/upload) data, respectively. Here, the mobile telephone network 210 allocates a full-duplex channel based on the GSM technology to each pair of telephones 205 involved in a telephone call. A full-duplex channel is then used to transmit audio information between the telephones 205 in both directions, so as to allow their users to talk and to hear simultaneously.

In a particular implementation, at least part of the telephones 205 supports a push to talk function. These telephones 205 may communicate via radio signals (for example, in the VHF spectrum) directly with one another. Here, a half-duplex channel is created (over a two-way radio link) among the involved telephones 205. The half-duplex channel is used to transmit audio information from one telephone 205 to other suitably equipped telephones 205 within its transmission range (so as to allow their users to talk and to hear, respectively). Particularly, the telephones 205 are normally in receive mode (so as to avoid hearing any background noise from the users that are not speaking); when the user of any telephone 205 wants to speak, s/he presses a dedicated button that switches the telephone 205 into transmit mode and maintains the transmit mode until the end of the radio transmission. Typically, a user provides procedure words during the conversation, so that every user participating in it is aware of the actions and intentions of the other users (such as "over" to close each radio transmission and "out" to close the conversation). The telephone may broadcast a radio transmission openly to any other telephone 205 (within the corresponding transmission range). Alternatively, the telephone may direct a radio transmission to a single user (one-to-one mode). In a particular implementation, the telephone or communications server may encrypt the radio transmission with a public key of the user to which it is addressed, so that only the intended recipient's telephone 205 is able to decrypt the radio transmission with the corresponding private key. Moreover, an identifier of the transmitting user is added to the radio transmission to allow the receiving user to respond in the same way.

The telephones 205 may also access a communication network 215 (for example, the Internet), through either the mobile telephone network 210 or wireless network access points. For example, the telephones are equipped with one or more wireless communication devices configured to use WI-FI communication protocols. In a particular implementation, the communication network 215 comprises a large number of servers, or other computing systems (herein "servers"), providing corresponding services. In a particular implementation, one or more switching server(s) 220 provides services that are exploited by the telephones 205 for switching the conversations between their communication techniques, as described in detail herein.

Each one of the above-described computing devices of the infrastructure 200 (i.e., the telephones 205 and the switching server 220) comprises several units that are connected among them (for example, through a communication bus and a cabling sub-system of a data center for the switching server 220 or through a communication bus for the telephones 205). Particularly, one or more microprocessors (μP) 225 control operation of the computing device; a non-volatile memory storage device 230 (for example, an EPROM) stores basic code for a bootstrap of the computing device and a volatile memory storage device 235 (for example, a DRAM) is used as a working memory by the microprocessors 225. The computing device has a mass-memory 240 for storing programs and data (for example, storage devices of the data center for the switching server 220 and flash memories for the telephones 205). Moreover, the computing device comprises a number of peripheral (or Input/Output, I/O) units 245. For example, the peripheral units 245 of the telephones 205 comprises a mobile telephone transceiver (TX/RX) for communicating with the mobile telephone network 210, a Wireless Network Interface Card (WNIC) of the Wi-Fi type for communicating with the access points, a two-way radio transceiver for communicating with the other telephones 205 directly, a GPS receiver for detecting a (current) position of the telephones 205, and a touch-screen for displaying information and entering commands. Furthermore, the peripheral units 245 of the switching server 220 comprise a network interface card (NIC) for connecting with the communication network 215 (through a router sub-system of the data center) and a drive for reading/writing removable storage units (like DVDs) implemented by a console of the data center.

Figure 3:
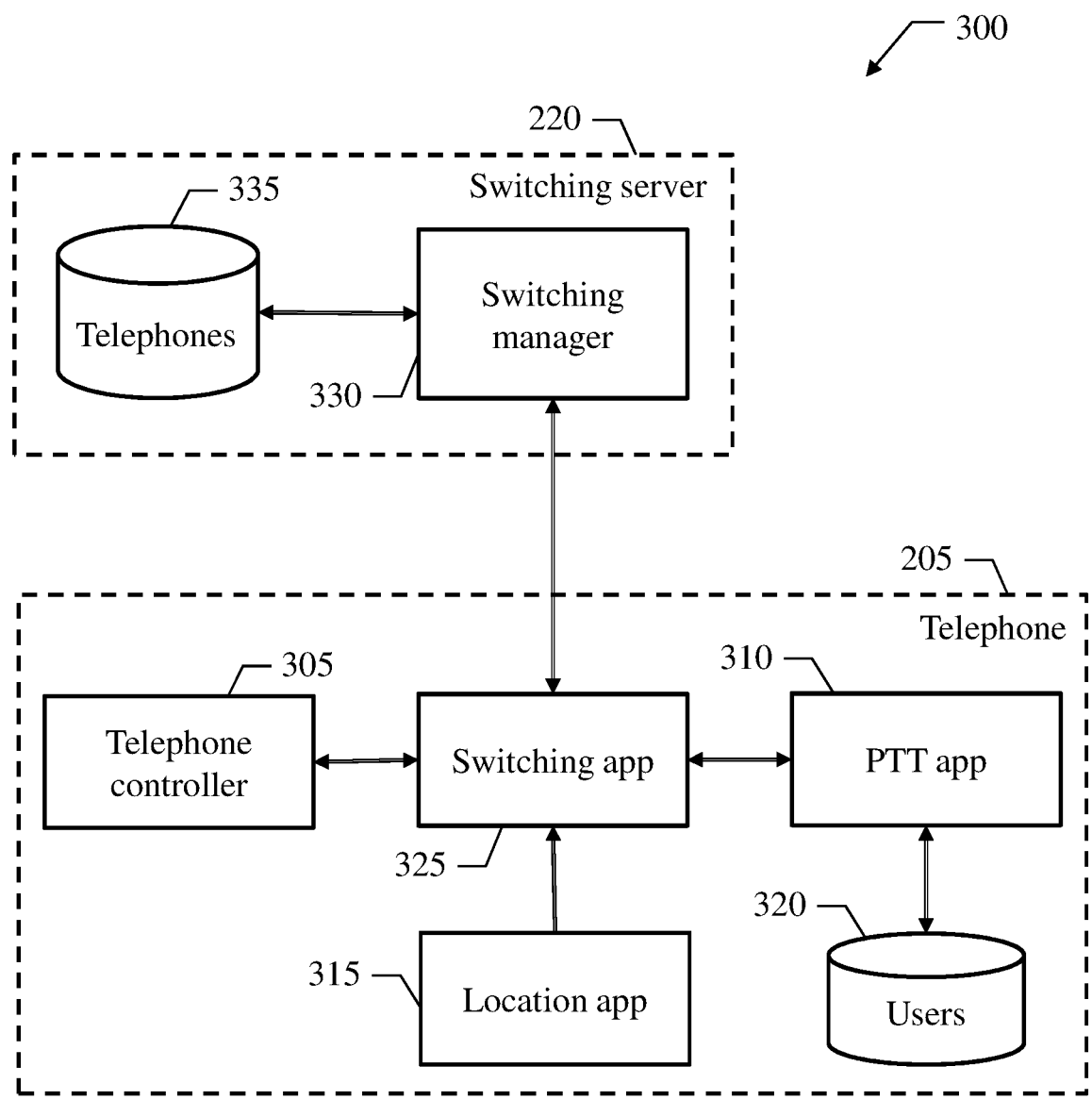
FIG. 3 depicts software components that may be used to implement an embodiment of the present disclosure.

FIG. 3 illustrates the main software components used to implement the solution according to an embodiment of the present disclosure.

Particularly, reference 300 refers to all the software components (programs and data) together. The software components are typically stored in one or more mass memory storage devices and loaded (at least partially) into the working memory of each computing device when the programs are running together with an operating system and other application programs (not shown). The programs are initially installed into the mass memory storage devices. For example, the programs are installed from removable storage units or from the communication network. In this respect, each program may be a module, segment, or portion of code, which comprises one or more executable instructions for implementing the specified logical function.

Originating from each telephone 205 (only one shown in the figure), a telephone controller 305 controls any communication of the telephone 205 exchanged with the mobile telephone network (not shown in the figure) such as performing telephone calls and exchanging data. In a particular implementation, several mobile applications (apps) run on top of an operating system of the telephone 205 (not shown in the figure). Particularly, native apps are pre-installed on the telephone 205; as far as relevant to the present disclosure, the native apps comprise a PTT app 310 controlling the radio transceiver for implementing the push to talk communication technique and a location app 315 controlling the GPS receiver. In a particular aspect, the PTT app 310 controls (in read/write mode) a user book (or database) 320 storing information about or related to the user of the telephone 205 and of the users of other telephones known thereto (e.g. contacts). In a particular implementation, each user of the user book 320 stores his/her biographic data (such as a given or user name and (mobile)) and telephone number. Where the corresponding telephone 205 supports the push to talk communication technique, the user book 320 further stores a corresponding PTT identifier thereof (not necessarily equal to the telephone number) and his/her public key, in addition to the private key for the user of the telephone 205.

In the solution according to an embodiment of the present disclosure, a switching app 325 controls the switching of the conversations between the communication techniques supported by the telephone 205 (i.e., the mobile communication technique, or simply GSM communication technique, and the push to talk communication technique, or simply PTT communication technique, in the example at issue). In a particular implementation, one or more properly configured processors downloads the switching app 325 from a data store or database and installs the app on the telephone 205 upon receiving an initiating request (assuming that the telephone 205 supports the PTT communication technique). The switching app 325 communicates with the telephone controller 305 and with the PTT app 310, and it utilizes the location app 315 to assist in location determination.

Moving to the switching server 220, a switching manager 330 provides the services used by the telephones 205 for switching the conversations between their communication techniques. In a particular implementation, the switching manager 330 communicates with the switching app 325 of the telephones 205. Moreover, the switching manager 330 controls (in read/write mode) a telephone repository 335 storing information relating to the telephones 205 involved in any conversation that is in progress. In a particular implementation, for each relevant telephone 205 (identified by its telephone number) the telephone repository 335 stores an indication of its (current) signal strength and position.

Figure 4A:
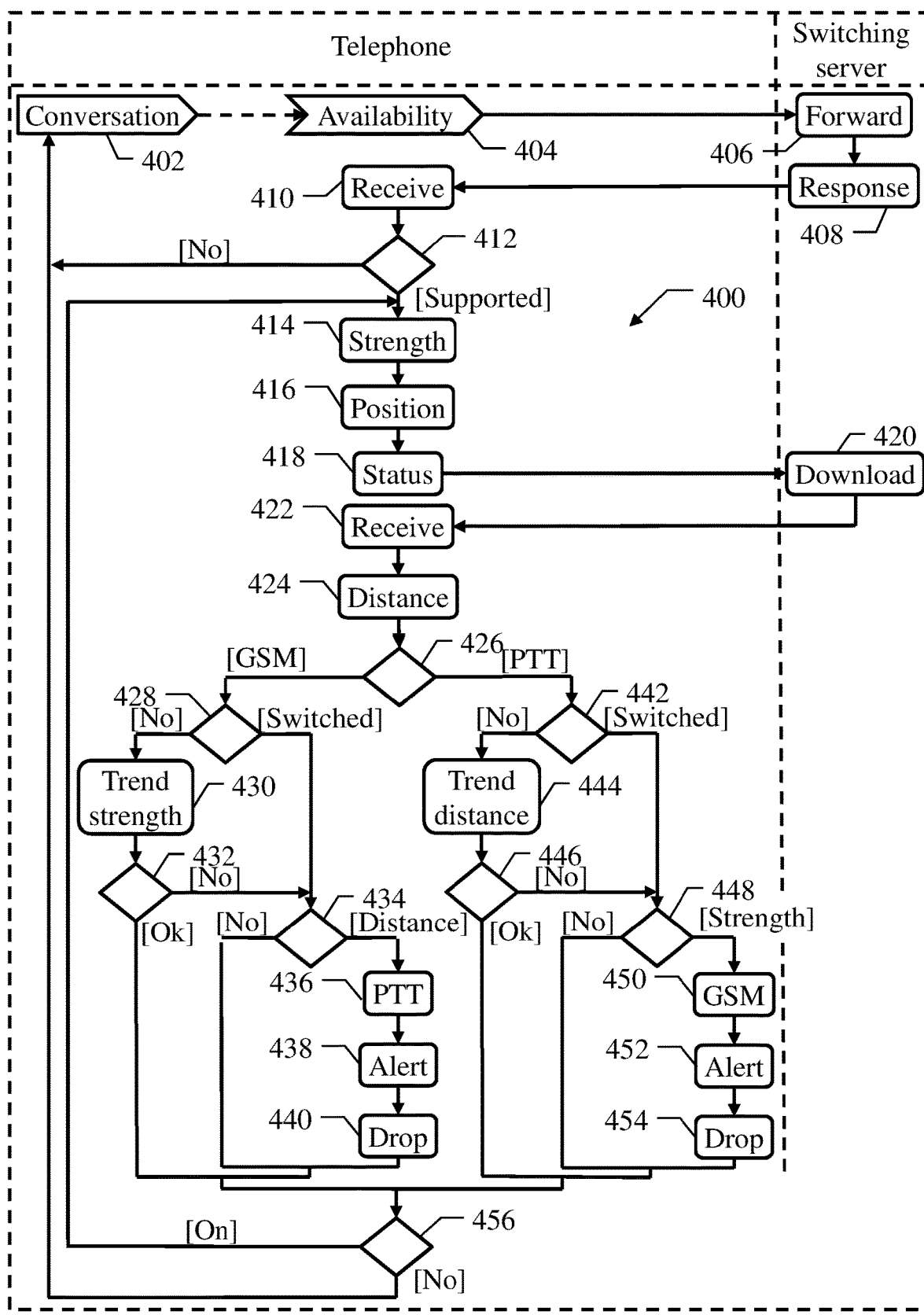
FIG. 4A provides an activity diagram describing the flow of activities relating to an implementation of the present disclosure.
Figure 4B:
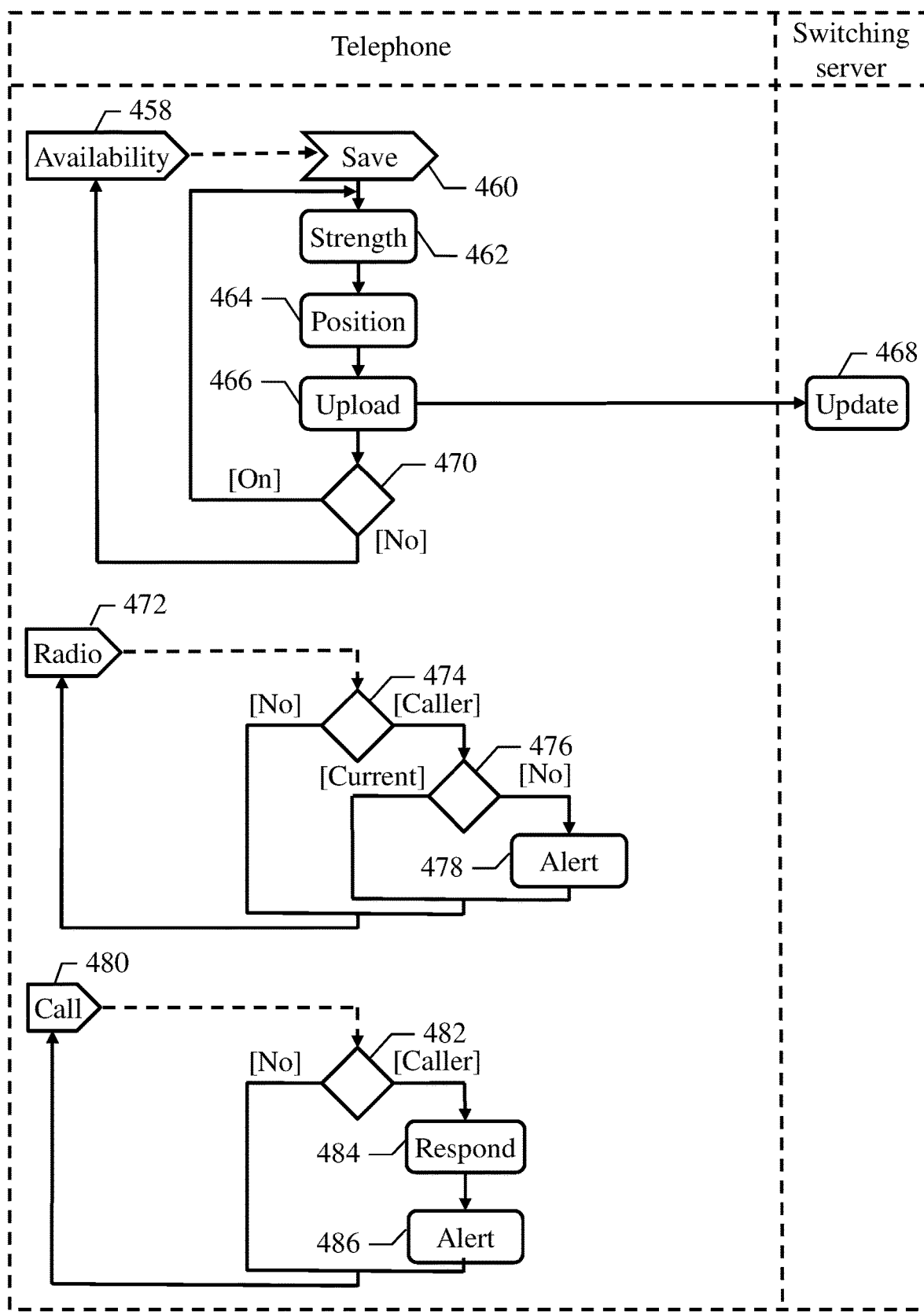
FIG. 4B provides an activity diagram describing the flow of activities relating to a further implementation of the present disclosure.

FIG. 4A-FIG. 4B provides an activity diagram describing the flow of activities relating to an implementation of the solution according to an embodiment of the present disclosure.

FIG. 4A represents a particular implementation of the step performed by the switching server to manage a generic conversation according to the flow diagram 400. In this respect, each block may correspond to one or more executable instructions for implementing the specified logical function on the relevant computing devices.

Using a generic telephone, the process passes from block 402 to block 404 as soon as a conversation has been established (i.e., started) by its user, or caller, with the user of another telephone, or receiver (by either performing a telephone call to his/her telephone number or transmitting a radio communication to his/her PTT identifier in a one-to-one mode). In response thereto, the switching app initializes a communication variable to indicate the (current) communication technique of the conversation (i.e., GSM or PTT) and submits an availability request to the switching server to verify the availability of the switching app on the telephone of the receiver (by passing the telephone number and the PTT identifier of the receiver, one used to establish the conversation and the other extracted from the user book, and the communication variable). Moving to switching server at block 406, in response to the request, the switching manager forwards the availability request to the telephone of the receiver (identified by its telephone number), as shown with reference to block 408, as soon the switching manager receives a response to the availability request from the telephone of the receiver or in any case after a predefined delay (for example, 5-10 s). Here, the switching manager returns a corresponding data value response to the telephone of the caller. A first, or positive indication, data value indicates that the switching app is available on the telephone of the receiver when a corresponding response has been received from it and a second, or negative indication, data value indicates the unavailability of the switching app. Returning to the swim-lane of the telephone (of the caller), the switching app receives this response, such as provided in block 410. In response thereto, the flow of activity branches at block 412. Particularly, if the response indicates the negative availability of the switching app, the process returns to the block 402 directly waiting for a next conversation (without performing any action).

Conversely, if the response indicates the availability of the switching app, the process continues to block 414, wherein the switching app detects, in one implementation, the signal strength of the telephone (i.e., of its connection with the mobile telephone network) by exploiting the telephone controller. Continuing to block 416, the switching app detects the position of the telephone in one implementation by exploiting the location app. With reference to block 418, the switching app submits a request for status information of the telephone of the receiver to the switching server (by passing its telephone number). As shown in reference to block 420, the switching manager returns (downloads) the status information to the telephone of the caller. In one implementation, the status information comprises the signal strength and the position of the telephone of the receiver (identified by its telephone number) extracted from the telephone repository. Returning to the swim-lane of the telephone (of the caller), the switching app receives the status information at block 422. The switching app then calculates the distance of the telephones (of the caller and of the receiver) according to their positions determined at block 424.

In one implementation, the flow of activity branches at block 426 according to the current communication technique (as indicated in the communication variable). Particularly, where GSM communication technique is used, a suitably configured processor executes blocks 428-440. Alternatively, where the current communication technique is the PTT communication technique, a suitably configured processor executes blocks 442-454. In both cases, the flow of activity merges again at block 456.

With reference to block 428 (where current communication technique is the GSM communication technique), the switching app verifies if the (original) communication technique used at the beginning when the conversation was established is different from the GSM communication technique (as indicated in a switching flag). If not (switching flag is negative), the process descends into block 430 wherein the switching app determines a trend of the quality indicators of the GSM communication technique (i.e., the signal strength of the telephone of the caller and of the telephone of the receiver). For example, a signal strength trend is defined by a changing rate thereof in a last period (for example, 1-3 s). Continuing to block 432, the switching app verifies a risk of interruption of the conversation according to the signal strength of the telephones (of the caller and of the receiver). For example, the risk of interruption exists if for at least one of the signal strengths value is lower than a safety threshold (such as 20-30% of a maximum value thereof) and its trend is decreasing faster than a speed threshold (for example, 10-20%/s). Alternatively, a risk of interruption is present where the signal strength value is lower than a critical threshold (lower than the safety threshold, such as 5-10% of the same maximum value). Where the signal strength value is below the threshold value (meaning that the conversation is likely to be interrupted shortly), the process descends into block 434; the same point is also reached directly from the block 428 if the original communication technique is different from the GSM communication technique (i.e., it is the PTT communication technique, as indicated by the switching flag being asserted).

The switching app now verifies the possibility of establishing the conversation using the PTT communication technique according to its quality indicators (i.e., the distance of the telephones). For example, a suitably configured processor establishes a connection or conversation where the distance of the telephones is (possibly strictly) lower than a threshold (for example, 85-95% of the transmission range of the PTT communication technique). If the conversation may be established using the PTT communication technique, this means that a switching condition defined by the risk of interruption of the conversation using the GSM communication technique and by the possibility of establishing it with the PTT communication technique is fulfilled (when the block 434 is reached from the block 432) or that a restore condition simply defined by the possibility of re-establishing the conversation using the PTT communication technique like at the beginning is fulfilled (when the block 434 is reached from the block 428). In this case, the process then descends into block 436 wherein the switching app starts a (new) radio communication from the telephone of the caller to the telephone of the receiver (identified by its PTT identifier) in a one-to-one mode (on a public frequency within a predefined range). Continuing to block 438, the switching app outputs an alert (for example, an acoustic message) informing the caller that s/he now has to push the corresponding button to speak and updates the communication variable and the switching flag accordingly. After a predefined delay from the starting of the radio communication (for example, 0.5-1.0 s), at block 440 the switching app drops the telephone call between the telephones by terminating the connection. As a result, the conversation is switched from the GSM communication technique (current communication technique) to the PTT communication technique (other/original communication technique). The process then proceeds to block 456. Block 456 is also reached directly from the block 432 (if no risk of interruption of the conversation using the GSM communication technique exists) or from the block 434 (if no possibility exists of establishing the conversation using the PTT communication technique) without performing any action.

With reference instead to block 442 (current communication technique equal to the PTT communication technique), the switching app verifies whether the original communication technique is different from the PTT communication technique (as indicated in the switching flag). If not (switching flag is negative), the process proceeds to block 444 where the switching app determines a trend of the quality indicators of the PTT communication technique (i.e., the distance of the telephones). For example, the trend is defined by a changing rate of the distance of the telephones in a last period (for example, 1-3 s). Continuing to block 446, the switching app verifies a risk of interruption of the conversation according to the distance of the telephones. For example, the risk of interruption exists if its value is higher than a safety threshold (such as, 75-85% of the transmission range of the PTT) and its trend is decreasing faster than a speed threshold (for example, 0-10%/s), or in any case if its value is higher than a critical threshold (higher than the safety threshold, such as 90-95% of the same transmission range of the PTT). If so (meaning that the conversation is likely to be interrupted shortly), the process proceeds to block 448; the same point is also reached directly from the block 442 if the original communication technique is different from the PTT communication technique (i.e., it is the GSM communication technique, as indicated by the switching flag being asserted).

In both cases, the switching app now verifies the possibility of establishing the conversation using the GSM communication technique according to its quality indicators (i.e., the signal strength of the telephones). For example, the conversation may be established if the signal strength of both telephones is (possibly strictly) higher than a threshold (such as 10-20% of the maximum value thereof). If the conversation may be established using the GSM communication technique, this means that a switching condition defined by the risk of interruption of the conversation using the PTT communication technique and by the possibility of establishing it with the GSM communication technique is fulfilled (when the block 448 is reached from the block 446) or that a restore condition simply defined by the possibility of re-establishing the conversation using the GSM communication technique is fulfilled (such as when the block 448 is reached from the block 442). In this case, the process then proceeds to block 450 wherein the switching app performs a (new) telephone call from the telephone of the caller to the telephone of the receiver (identified by its telephone number). Continuing to block 452, the switching app outputs an alert (for example, an acoustic message) informing the caller that the user does not have to push the corresponding button to speak any longer and it updates the communication variable and the switching flag accordingly. In one implementation, after a predefined delay from a response to the telephone call by the telephone of the receiver, as described in the following (for example, 0.5-1.0 s), at block 454 the switching app drops the radio communication between the telephones by disabling the PTT app. As a result, a suitably configured processor switches from the PTT communication technique (current communication technique) to the GSM communication technique (other/original communication technique). The process then proceeds to block 456; the same point is also reached directly from the block 446 (if no risk of interruption of the conversation using the PTT communication technique exists) or from the block 448 (if no possibility exists of establishing the conversation using the GSM communication technique) without performing any action.

In this way, the use of the trends of the quality indicators of the current communication technique allows anticipation of potential interruptions to the conversation and then switching to another communication technique before this actually happens. The verification of the original communication technique (independently of the quality indicators of the current communication technique) allows restoring it as soon as possible, so as to return to the initial choice of the users. The coexistence of the two communication techniques (for at least some time) during their switching ensures the continuity of the conversation, and allows the user to engage in seamless switching.

With reference now to block 456, the switching app verifies whether the conversation is still in progress (i.e., the corresponding telephone call or radio communication is on). If so, the process returns to the block 414 to repeat the same operations continuously. For example, after a predefined delay (such as 1-3 s), the foregoing operations are performed periodically (with a corresponding frequency) in order to limit any overhead of the telephone. Conversely, where a suitably configured processor terminates the conversation, the process returns to the state identified in block 402 and awaits a new conversation.

In an alternative implementation, illustrated in FIG. 4B, the process passes from block 458 to block 460 in the swim-lane of the telephone (of the receiver) as soon as it receives an availability request from the switching server (submitted thereto by the telephone of the caller). In response thereto, the switching app saves the telephone number and the PTT identifier of the caller and initializes the communication variable accordingly (as per the information extracted from the availability request). The switching app then detects the signal strength of the telephone at block 462 (by exploiting the telephone controller). Continuing to block 464, the switching app detects the position of the telephone (by exploiting the location app). With reference to block 466, the switching app uploads its status information, comprising the signal strength and the position of the telephone, to the switching server. In one implementation, the status also defines a positive response to the availability request, indicating that the switching app is available on the telephone (for use by the switching server at block 408). Moving to the swim-lane of the switching server at block 468, in response thereto, the switching manager updates the telephone repository accordingly. Returning to the swim-lane of the telephone (of the receiver), at the same time the process proceeds from the block 466 to the block 470, such that the switching app verifies whether the conversation with the caller is still in progress (i.e., the corresponding telephone call or radio communication is on). If so, the process returns to the block 462 to repeat the same operations continuously. For example after a predefined delay (such as 1-3 s), these operations are performed periodically (with a corresponding frequency) in order to limit any overhead of the telephone. Conversely, a where a suitably configured processor terminates the connection or conversation, the process returns to the block 458 waiting for a next availability request.

In yet a further implementation, the process passes from block 472 to block 474 in the swim-lane of the telephone (of the receiver) as soon as it receives any radio communication. Upon receipt of such a signal, the switching app verifies whether the telephone received the radio communication from the caller of the conversation in progress using the GSM communication technique (as indicate by its PTT identifier saved previously). If so, the process proceeds to block 476 wherein the switching app verifies whether the PTT communication technique is the current one (as indicated in the communication variable). If not, such that the conversation is switched to PPT, the process proceeds to block 478. Here, as above, the switching app outputs an alert (for example, an acoustic message) informing the receiver that s/he now has to push the corresponding button to speak (since the conversation has been switched to the PTT communication technique) and it updates the communication variable accordingly. The process then proceeds to block 472 and waits for a next radio communication. Block 472 is also reached directly from the block 474 (if the radio communication has not been received from the caller of the conversation in progress using the GSM communication technique) or from the block 476 (if the PTT communication technique is the current one, meaning that the conversation has already been switched thereto) without performing any action.

In one implementation, the process passes from block 480 to block 482 in the swim-lane of the telephone (of the receiver) as soon as it receives any telephone call. In response thereto, the switching app verifies whether telephone has received the telephone call from the caller of the conversation in progress using the PTT communication technique (as indicated by its telephone number saved previously). The switching app automatically responds to the telephone call by exploiting the telephone controller as provided in block 484. Continuing to block 486, as above the switching app outputs an alert (for example, an acoustic message) informing the receiver that s/he does not have to push the corresponding button to speak any longer (since the conversation has been switched to the GSM communication technique) and it updates the communication variable accordingly. The process then proceeds to block 480 and awaits a new telephone call. Block 480 is also reached directly from the block 482, if the telephone call has not been received from the caller of the conversation in progress using the PTT communication technique, without performing any action, so that the telephone call is managed as usual.

Here, the switching server provides an accurate evaluation of the switching condition according to actual values of the quality indicators of both the telephones.

Figure 5A:
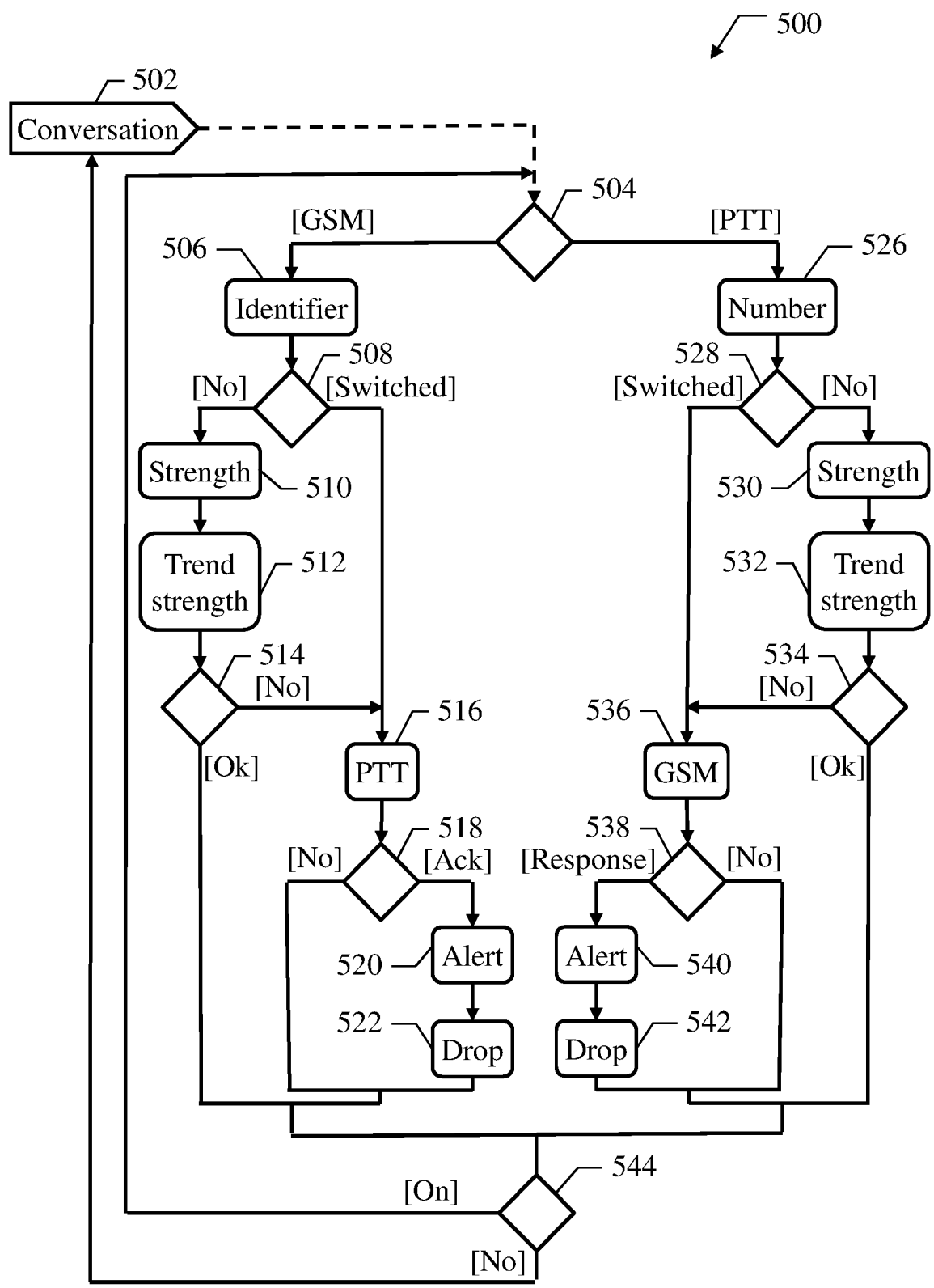
FIG. 5A provides an activity diagram describing the flow of activities relating to an implementation of the present disclosure.
Figure 5B:
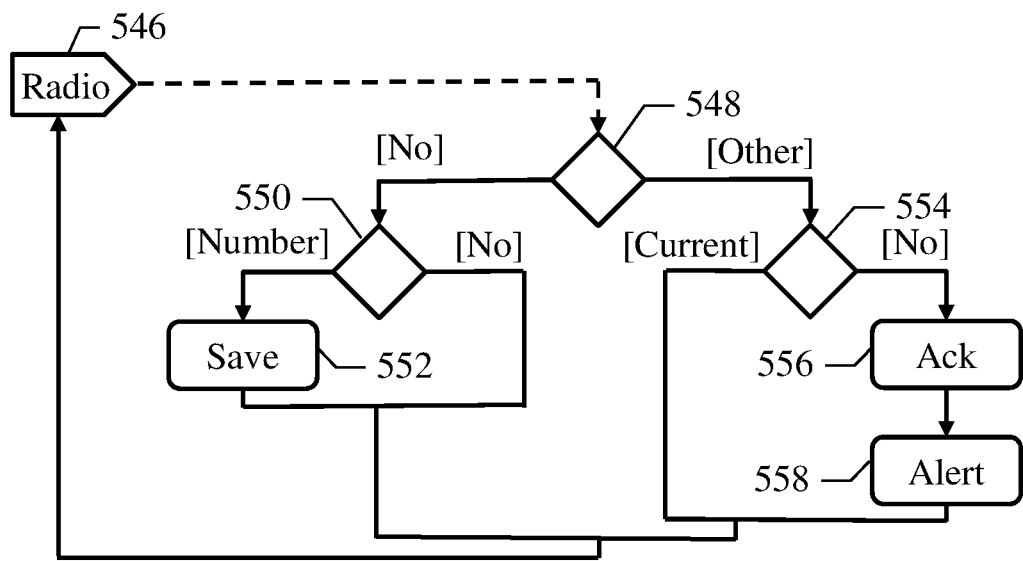
FIG. 5B provides an activity diagram describing the flow of activities relating to an implementation of the present disclosure.
Figure 5B:
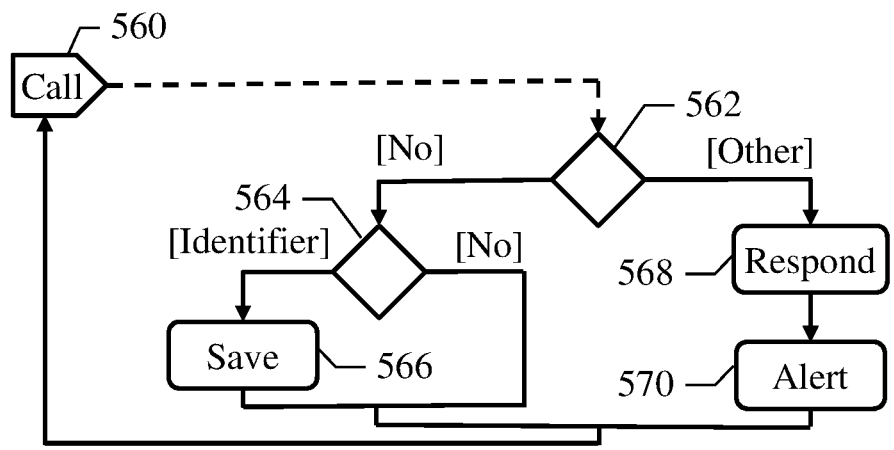

With reference now to FIG. 5A-FIG. 5B, an activity diagram describes the flow of activities relating to an implementation of the solution according to an embodiment of the present disclosure.

Particularly, the diagram represents an exemplary process that is used to manage a generic conversation with a method 500 in case of implementation without any switching server. In this respect, each block may correspond to one or more executable instructions for implementing the specified logical function on the relevant computing devices.

With reference to a generic telephone, the process proceeds from block 502 to block 504 as soon as a conversation has been established between its user and the user of another telephone (by either a telephone call between their telephone numbers or a radio communication between their PTT identifiers in a one-to-one mode). From here, the flow of activity branches according to the (current) communication technique of the conversation. Particularly, if the current communication technique is the GSM communication technique the blocks 506-522 are executed, whereas if the current communication technique is the PTT communication technique the blocks 526-542 are executed; in both cases, the flow of activity proceeds again to block 544.

With reference to block 506 (current communication technique equal to the GSM communication technique), the switching app initializes a communication variable to indicate the current communication technique (GSM) and it transmits the PTT identifier of the user of the telephone (extracted from the user book) to the other telephone. For example, the PTT identifier is transmitted via the telephone call by inserting it into a custom field of the GSM protocol. Continuing to block 508, the switching app verifies whether the (original) communication technique used at the beginning when the conversation was established is different from the GSM communication technique (as indicated in a switching flag). If not (switching flag is negative), the process proceeds to block 510 wherein the switching app detects the signal strength of the telephone (by exploiting the telephone controller). With reference now to block 512, the switching app determines a trend of the quality indicators of the GSM communication technique (i.e., the signal strength of the telephone). For example, as above the trend is defined by a changing rate of the signal strength of the telephone in the last period. Continuing to block 514, the switching app verifies a risk of interruption of the conversation according to the signal strength of the telephone. For example, the risk of interruption exists if the signal strength of the telephone is lower than the safety threshold and its trend is decreasing faster than the speed threshold. Alternatively, the risk of interruption exists if the signal strength of the telephone is lower than the critical threshold. If such conditions exists, (meaning that the conversation is likely to be interrupted shortly), the process proceeds to block 516. Block 516 is also reached directly from the block 508 if the original communication technique is different from the GSM communication technique (i.e., it is the PTT communication technique, as indicated by the switching flag being asserted).

In both cases, the switching app attempts a (new) radio communication from the telephone to the other telephone (identified by its PTT identifier) in a one-to-one mode (on a public frequency within a predefined range). The flow of activity then branches at block 518 according to a result of this attempt. Particularly, if a corresponding acknowledgment is received from the other telephone within a predefined delay, (for example, 1-3 s and by means of another radio communication), the conversation may be established using the PTT communication technique. Such a connection implies that the quality of the connection is sufficient. Therefore, a switching condition defined by the risk of interruption of the conversation using the GSM communication technique and by the possibility of establishing communication using the PTT communication technique is fulfilled, for example, such as when the block 518 is reached from the block 516 or a restore condition simply defined by the possibility of re-establishing the conversation using the PTT communication technique is fulfilled (e.g. when the block 518 is reached from the block 508). In this case, the process then proceeds to block 520 where the switching app outputs an alert (for example, an acoustic message) informing the caller that s/he now has to push the corresponding button to speak and it updates the communication variable and the switching flag accordingly. Continuing to block 522, after a predefined delay from the initiation of the radio communication (for example, 0.5-1.0 s), the switching app drops the telephone call between the telephones by closing it. As a result, the telephone switches from the GSM communication technique (current communication technique) to the PTT communication technique (other/original communication technique). The process then proceeds to block 544. Block 544 is also reached directly from the block 514 (if no risk of interruption of the conversation using the GSM communication technique exists) or from the block 518 (if it has not been possible to establish the conversation using the PTT communication technique) without performing any action.

With reference instead to block 526 (current communication technique equal to the PTT communication technique), the switching app initializes the communication variable to indicate the current communication technique (e.g. PTT) and transmits the telephone number of the telephone (extracted from the user book) to the other telephone. For example, a telephone converts the telephone number into an audio signal, and transmits the audio signal with a corresponding radio communication. Continuing to block 528, the switching app verifies whether the original communication technique is different from the PTT communication technique (as indicated in the switching flag). If not (switching flag is negative), the process descends into block 530 wherein the switching app detects the radio strength of the telephone (for example, of a last radio communication received from the other telephone) by exploiting the PTT app. With reference now to block 532, the switching app determines a trend of the quality indicators of the PTT communication technique (i.e., the radio strength of the telephone). For example, the trend may be a value correlated to the changing rate of the radio strength of the telephone in the last period. Continuing to block 534, the switching app verifies a risk of interruption of the conversation according to the radio strength of the telephone. For example, the risk of interruption exists if the radio strength of the telephone is lower than a safety threshold (such as 20-30% of a maximum value thereof) and its trend is decreasing faster than a speed threshold (for example, 10-20%/s). Alternatively, the radio strength of the telephone is lower than a critical threshold (lower than the safety threshold, such as 5-10% of the same maximum value). If so (meaning that the conversation is likely to be interrupted shortly), the process proceeds to block 536. Block 536 is also reached directly from the block 528 if the original communication technique is different from the PTT communication technique (i.e., it is the GSM communication technique, as indicated by the switching flag being asserted).

Regardless of the steps taken to block 536, the switching app attempts a (new) telephone call from the telephone to the other telephone (identified by its telephone number). The flow of activity branches at block 538 based on the result of this attempt. Specifically, where the other telephone responds to the telephone call within a predefined delay, (for example within 2-5 seconds) the conversation may be established using the GSM communication technique (and quality of the call is implied to be sufficient). Thus, a switching condition defined by the risk of interruption of the conversation using the PTT communication technique and by the possibility of establishing a connection using the GSM communication technique is fulfilled (when the block 536 is reached from the block 528) or a restore condition simply defined by the possibility of re-establishing the conversation using the GSM communication technique like at the beginning is fulfilled (when the block 536 is reached from the block 528). The process then proceeds to block 540 where the switching app outputs an alert (for example, an acoustic message) informing the caller that s/he does not need to push the corresponding button to speak any longer. Furthermore, the switching app updates the communication variable and the switching flag accordingly. Continuing to block 542, after a predefined delay from the starting of the telephone call (for example, 0.5-1.0 s), the switching app drops the radio communication between the telephones by disabling the PTT app. As a result, a suitably configured processor switches the conversation from the PTT communication technique (current communication technique) to the GSM communication technique (other/original communication technique). The process then proceeds to block 544. Block 544 is also reached directly from the block 534 (if no risk of interruption of the conversation using the PTT communication technique exists) or from the block 538 (if it has not been possible to establish the conversation using the GSM communication technique) without performing any action.

With reference now to block 544, the switching app verifies if the conversation is still in progress (i.e., the corresponding telephone call or radio communication is on). Where the conversation is still in progress, the process proceeds to block 504 and repeats the step referenced in block 544. In one implementation, such continuous operation happens after a predefined delay (such as 1-3 s), so that these operations are performed periodically (with a corresponding frequency) in order to limit any overhead of the telephone. Conversely, process returns to the block 502 and awaits a new conversation upon termination of the conversation.

In a further implementation, the process proceeds from block 546 (FIG. 5B) to block 548 when the telephone receives a radio communication. The switching app verifies if the telephone receives the radio communications from the other telephone of the conversation in progress using the GSM communication technique (as indicate by its PTT identifier saved previously). If not, the switching app verifies, at block 550, if the radio communication indicates a telephone number (such as by converting the corresponding audio signal into a digital text with speech recognition techniques and then parsing it). Turning to block 552, the switching app saves the telephone number (i.e. the telephone number of the other telephone of the recently initiated conversation using the PTT communication technique) and initializes the communication variable to indicate the GSM communication technique as the current one (without outputting any sound). Returning to the block 548, where the radio communication has been received from the other telephone of the conversation in progress (such as through using the GSM communication technique) the process proceeds to block 554. Here, the switching app verifies if the PTT communication technique is the current one (as indicated in the communication variable). If not, such that the conversation is being switched thereto, the process proceeds to block 556. Here, the switching app transmits a radio communication (defining a corresponding acknowledgment) to the other telephone. Continuing to block 558, the switching app outputs an alert (for example, an acoustic message) informing the user of the telephone that s/he now has to push the corresponding button to speak (since the conversation has been switched to the PTT communication technique) and updates the communication variable accordingly. The process proceeds to block 546 where the switching app waits for a new radio communication. Block 546 is also reached directly from the block 550 (if the radio communication has not been received from the other telephone of the conversation in progress using the GSM communication technique) or from the block 554 (if the PTT communication technique is the current one, meaning that the conversation has already been switched thereto) without performing any action.

In a further implementation, the process proceeds from block 560 to block 562 when the telephone receives a telephone call. In response thereto, the switching app verifies whether the telephone received the telephone call from the other telephone of the conversation in progress using the PTT communication technique (as indicated by its previously saved telephone number). If the call is not received using the PTT communication technique, the switching app verifies, at block 564, if the telephone call includes a PTT identifier in a custom field of the GSM protocol. According to block 566, where a PTT identifier is present, the switching app saves this PTT identifier (of the other telephone of the conversation initiated using the GSM communication technique) and initializes the communication variable to indicate the GSM communication technique as the current one. Returning to the block 562, where the telephone call has been received from the other telephone involved in the in-progress communication, (here using the PTT communication technique), the process proceeds to block 568 wherein the switching app automatically responds to the telephone call (by exploiting the telephone controller). Continuing to block 570, the switching app outputs an alert (for example, an acoustic message) informing the receiver that s/he does not have to push the corresponding button to speak any longer (since the conversation has been switched to the GSM communication technique) and updates the communication variable accordingly. The process then proceeds to block 560, where the switching app awaits a new telephone call. Block 560 is also reached directly from the block 564 (if the telephone call has not been received from the other telephone of the conversation in progress using the PTT communication technique) without performing any action, so that the telephone call is managed as usual.

In a further implementation, the switching server is not used, thereby simplifying the process described herein and rendering the same more readily available to the users.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions, and changes in the details as well as other embodiments are possible. Particularly, different embodiments of the present disclosure may even be practiced without the specific details (such as the numerical values) set forth in the preceding description to provide a more thorough understanding thereof. Conversely, well-known features may have been omitted or simplified in order not to obscure the description with particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence, or order. The terms 'include', 'comprise', 'have', 'contain' and 'involve' (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing voice conversations. However, the voice conversations may be among any number and type of users such as between police officers, business associates, or friends).

In an embodiment, the method comprises establishing a voice conversation between a first user of a first telephone terminal and a second user of a second telephone terminal. However, the telephone terminals may be of any type (for example, tablets).

In an embodiment, the voice conversation is established using a current communication technique of a plurality of communication techniques supported by the first telephone terminal and the second telephone terminal. However, the communication techniques may be in any number and of any type (for example, GSM, PTT and/or one or more VOIP services).

In an embodiment, the method comprises monitoring one or more quality indicators of the current communication technique. However, the quality indicators may be in any number and of any type (for example, relating to a single telephone terminal or to both of them) and the monitoring of quality indicators can take many different forms, such as continuously or only during the conversations).

In a particular embodiment, the method comprises switching the voice conversation from the current communication technique to a selected one of the other communication techniques different from the current communication techniques. However, the switching may be performed in any way (such as to prevent switching too frequently) and with respect to any selected communication technique (such as such as according to its quality indicators or simply with a round-robin policy).

In a particular embodiment, the step of switching is performed in response to a switching condition based on the quality indicators of the current communication technique and on one or more quality indicators of each one of the other communication techniques. However, the switching condition relates to a plurality of factors. For example, the switching condition relates to the actual quality the other communication techniques or simply the possibility of quality conditions to determine the switching condition. Additionally, a suitably configured processor monitors the quality indicators of other communication techniques at discrete points in time or continuously. For example, the telephone monitors the quality indicators of the present communication technique as well quality indicators of unused communication either continuously or only when it is necessary. For example, such the telephone monitors alternative quality indicators when the risk of interruption of the voice conversation exists.

In a particular embodiment, the step of switching includes verifying the switching condition according to a risk of interruption of the voice conversation based on a trend of the quality indicators of the current communication technique and on a possibility of establishing the voice conversation using each other communication technique according to the corresponding quality indicators. However, the risk of interruption of the conversation using the current communication technique and the possibility of using the other communication technique may be verified in any way (for example, separately or by combining their quality indicators in any way). Moreover, the trend of quality indicators may be determined in any way (for example, by filtering too sharp variations possibly caused by noise). In a further implementation, for the current communication technique or any one of the other communication techniques only the values of the quality indicators, only their trends or any combinations thereof are considered.

In a particular embodiment, the step of switching includes starting a new communication with the selected communication technique for implementing the voice conversation. However, the new communication may be started in any way (for example, automatically or requiring its acceptance, always or only in specific situations—such as depending on corresponding costs).

In a further implementation, the step of switching comprises terminating a current communication with the current communication technique implementing the voice conversation after a predefined delay from the starting of the new communication. Here, the delay may have any value. Furthermore, it is possible to drop the current communication immediately after the starting of the new communication.

In a further embodiment, the communication techniques described herein comprise a mobile telephone communication technique based on a connection with a mobile telephone network and a push to talk communication technique based on a direct radio connection. However, the telephone communication technique and the push to talk communication technique may be of any type (for example, based on the 2G-4G, Bluetooth technology).

In an alternative embodiment, the step of switching comprises performing a new radio communication from the first telephone terminal to the second telephone terminal using the push to talk communication technique in order to switch the voice conversation from a current telephone communication technique to a second communication technique. However, the new radio communication may be of any type (for example, actually transmitting audio information or simply used as a handshaking without any output).

In an alternative embodiment, the step of switching comprises performing a new telephone call from the first telephone terminal to the second telephone terminal using the mobile telephone communication technique. The new telephone call causes the second telephone terminal to respond to the new telephone call by automatically switching the voice conversation from a current radio communication between the first telephone terminal and the second telephone terminal to a push to talk communication technique. However, the new telephone call may be of any type (for example, requiring a manual response).

In an alternative embodiment, one or more the telephones, or communication servers, perform the following operations when the current communication technique is the mobile telephone communication technique.

In a specific embodiment, said the step of monitoring communication signal; strength comprises monitoring a first signal strength of the connection of the first telephone terminal with the mobile telephone network. However, a suitably configured processor defines the first signal strength according to any number and type of parameters. For example, the first signal strength is defined according to the peak and/or average intensity of the signal. Furthermore, the telephone terminal itself or the mobile telephone network monitors the signal strength according to one or more monitoring devices.

In a further embodiment, the monitoring step comprises monitoring a second signal strength of the connection of the second telephone terminal with the mobile telephone network. However, the second signal strength is relative to any number and type of parameters (either the same or different with respect to the first signal strength) and it may be monitored in any way. For example, monitoring includes receiving signal strength information from the second telephone terminal directly or from the mobile telephone network).

In a particular embodiment, the step of switching comprises detecting a first position of the first telephone terminal. Detecting the first position includes using one or more of a number of different parameters (such as by GPS coordinates or latitude/longitude coordinates). For example, such positions by the telephone terminal or the mobile telephone network with any tracking technique, such as based on GPS, Wi-Fi, cell towers information).

In an embodiment, in this case said step of switching comprises detecting a second position of the second telephone terminal. However, determining the second position accomplished in any way, such as either the same or different ways than with respect to the first position) and it may be detected in any way (for example, receiving it from the second telephone terminal directly or from the mobile telephone network).

In a further embodiment, in this case said step of switching comprises calculating a telephone distance between the first position and the second position. However, a suitably configured processor calculates the telephone in any manner, such as by calculating a simple difference or scaling it according to the characteristics of a corresponding area.

In a further embodiment, the following operations are performed when the current communication technique is the push to talk communication technique.

In a further embodiment, the step of monitoring comprises monitoring a first position of the first telephone terminal. However, the first position may be defined and it may be monitored in any way, such as either by the same or different approaches described herein with respect to its detection.

In a further embodiment, the step of monitoring comprises monitoring a second position of the second telephone terminal. However, the telephone monitors the second position in any way such as either by the same or different approaches described herein with respect to its detection.

In a further embodiment, the step of monitoring comprises monitoring a telephone distance between the first position and the second position. However, the telephone distance may be calculated and it may be monitored in any way such as either by the same as or different approaches described herein.

In a further embodiment, the step of switching comprises detecting a first signal strength of the connection of the first telephone terminal with the mobile telephone network. However, any number and type of parameters may define the first signal strength and it may be detected in any way such as either by the same or different approaches described herein with respect to its monitoring.

In a further embodiment, the step of switching comprises detecting a second signal strength of the connection of the second telephone terminal with the mobile telephone network. However, any number and type of parameters may define the second signal strength and one of the telephones, or communication servers detect the second signal in any way, such as either by the same or different approaches described herein with respect to its monitoring.

In a further embodiment, the method comprises submitting an availability request of the second telephone terminal from the first telephone terminal to a server computing system in response to the establishing of the voice conversation. However, the availability request may be submitted in any way (for example, via SMS) to any server computing system (for example, of telephone operators or a dedicated one). Here, the possibility of submitting the availability request directly to the second telephone terminal is not excluded.

In a further embodiment, the method comprises enabling said step of monitoring and said step of switching in response to a positive response to the availability request received from the server computing system. However, the response may be received in any way (either the same or different with respect to the submission of the availability request, or directly from the second telephone terminal.

In an embodiment, the method comprises downloading status information comprising an indication of the second signal strength and of the second position from the server computing system wherein the status information has been uploaded from the second telephone terminal. However, the status information may comprise additional information (for example, telephone number, PTT identifier, frequency of the radio communications) and it may be downloaded in any way (for example, via SMS). Here, the possibility of receiving the status information directly from the second telephone terminal is not excluded.

In a further embodiment, the following operations are performed when the current communication technique is the mobile telephone communication technique.

In a further embodiment, in this case the step of monitoring comprises monitoring a first signal strength of the connection of the first telephone terminal with the mobile telephone network. However, any number and type of parameters may define the first signal strength and it may be monitored in any of the approaches described herein.

In a further embodiment, the step of switching comprises attempting the new radio communication from the first telephone terminal to the second telephone terminal. However, the new radio communication may be attempted in any way such as either by transmitting either actual audio information or simply service information without any outputting thereof.

In a further embodiment, the step of switching comprises switching the voice conversation from the mobile telephone communication technique to the push to talk communication technique in response to an acknowledgment to the new radio communication from the second telephone terminal. However, the acknowledgment may be received in any way, such as either by the same or different approaches described herein with respect to the new radio communication.

In a further embodiment, the following operations are performed when the current communication technique is the push to talk communication technique.

In a further embodiment, in this case said step of monitoring comprises monitoring radio strength of an incoming radio communication received by the first telephone terminal from the second telephone terminal. However, any number and type of parameters such as, peak and/or average intensity may define the radio strength. One of the telephones, or a communication server, monitors the radio strength in any way, such as monitoring the radio strength over any time and/or number of last radio communications.

In a further embodiment, the step of switching comprises attempting the new telephone call from the first telephone terminal to the second telephone terminal. However, the new telephone call may be attempted in any way such as by performing a handshaking telephone call (and possibly another one in the opposite direction that is automatically refused).

In a further implementation, a suitably configured processor switches the voice conversation from the push to talk communication technique to the mobile telephone communication technique in response to the initiation of a new telephone call by the second telephone terminal. However, the suitably configured processor may also wait to switch to the new telephone call until the current call is dropped or terminated.

In a particular implementation, in response to the establishing of the voice conversation using the mobile telephone communication technique the method described herein, the method further comprises transmitting an indication of a push to talk identifier of the first telephone terminal from the first telephone terminal to the second telephone terminal using the mobile telephone communication technique to cause the second telephone terminal to store the push to talk identifier. However, one of the telephones or a communication server transmits the push to talk identifier in any manner, such as by SMS, without using the mobile telephone communication technique. For example, the one of the telephones or a communication server transmit the identifier via Internet. The same operations may also be performed in reverse order (e.g., the push to talk identifier of the second telephone terminal is transmitted to the first telephone terminal).

In a further embodiment, in response to the establishing of the voice conversation using the push to talk communication technique, the method further comprises transmitting an indication of a telephone number of the first telephone terminal from the first telephone terminal to the second telephone terminal using the push to talk communication technique to cause the second telephone terminal to store the telephone number. Here, the telephone may transmit the telephone number in a plurality of different ways, such as without using the push to talk communication technique or via SMS or the Internet. In a particular implementation, one of the telephones or a communication server transmits information in addition to the telephone number. For example, the telephone transmits the frequency of the radio communications transmitted. It appreciated that the same operations may also be performed in reverse order (to transmit the telephone number of the second telephone terminal to the first telephone terminal) in response thereto.

In a further embodiment, in response to said switching, the method comprises monitoring the quality indicators of the previous current communication technique. Here, the one of the telephones, or a communication server, monitors quality indicators, and such quality indicators may be of any type and they may be monitored in any way, such as by either similar or different approaches than the ones described herein with respect to the present current communication technique.

In a further embodiment, the method comprises switching the voice conversation from the selected communication technique to the previous current communication technique in response to a restore condition based on the quality indicators of the previous current communication technique. Here, a suitably configured processor verifies the restore condition in any way such as according to an actual measure of the quality of the previous current communication technique or simply to the possibility of using it.

Generally, similar considerations apply if the same solution is implemented with an equivalent method (by using similar steps with the same functions of more steps or portions thereof, removing some steps, or adding further optional steps); moreover, the steps may be performed in a different order, concurrently or in an interleaved way (at least in part).

An embodiment provides a computer program configured to cause a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. The software program may be implemented as a stand-alone module or as a plug-in for a pre-existing software program. For example, the software program is a management app of the telephone operator or software directly executed by the telephone operator. Moreover, the software program may run on the telephone only, or it may run in part on one or more server computing systems. For example, the software program implements the monitoring of the quality indicators and/or the verification of the switching/restoring condition. Alternatively, the software program is configured to operate in part on the telephone such that it only controls the switching functionality.

A further embodiment provides a system configured to perform each one of the steps of the above-mentioned method(s). A further embodiment provides a system comprising a circuitry (i.e., any hardware suitably configured, for example, by software) configured for performing each one of the steps of the same method. Here, the system may be of any type (for example, a telephone terminal performing all the above-mentioned operations, one or more server computing systems performing all the operations preceding the switching of the voice conversations for use by the telephone terminals for this purpose or their combination).

Generally, similar considerations apply if the system has a different structure or comprises equivalent components or it has other operative characteristics. In any case, every component thereof may be separated into more elements, or two or more components may be combined together into a single element. Moreover, each component may be replicated to support the execution of the corresponding operations in parallel. Moreover, unless specified otherwise, any interaction between different components generally does not need to be continuous, and it may be either direct or indirect through one or more intermediaries.

One aspect of the present invention includes a system, method, and/or computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing voice conversations, the method comprising:
    establishing, with a first telephone terminal, a voice conversation between a first user of the first telephone terminal and a second user of a second telephone terminal using a current communication technique selected from a plurality of communication techniques supported by the first telephone terminal and the second telephone terminal;
    monitoring, with the first telephone terminal, one or more quality indicators of the current communication technique and one or more quality indicators of at least one alternative communication technique of the plurality of communication techniques;
    switching, with the first telephone terminal during a duration of the voice conversation, the current communication technique to the at least one alternative communication technique of the plurality of communication techniques different from the current communication technique in response to a switching condition based on the one or more quality indicators of the current communication technique and the one or more quality indicators of the at least one alternative communication technique, wherein at least one of the one or more quality indicators corresponds to a distance between the first telephone terminal and the second telephone terminal, a distance trend corresponding to a change in distance between the first telephone terminal and the second telephone terminal over time, and a transmission range of both the current communication technique and of the at least one alternative communication technique present on both the first and second telephone terminals; and
    verifying the switching condition according to a risk of interruption of the voice conversation based on a trend of the one or more quality indicators relating to a signal strength of the current communication technique and a trend of the one or more quality indicators relating to a rate of change of distance between the first and second telephone terminals, and on a possibility of establishing the voice conversation using the at least one alternative communication technique.

2. The method according to claim 1, wherein switching comprises: starting a new communication with the second telephone terminal using the at least one alternative communication technique of the plurality of communication techniques; and
    dropping the current communication after a predefined delay from the start of the new communication.

3. The method according to claim 1, wherein the plurality of communication techniques include a mobile telephone communication technique based on a connection with a mobile telephone network and a push to talk communication technique based on a direct radio connection.

4. The method according to claim 3, wherein switching further comprises: establishing a new radio communication from the first telephone terminal to the second telephone terminal using the push-to-talk communication technique to switch the voice conversation thereto from a current telephone call between the first telephone terminal and the second telephone terminal.

5. The method according to claim 3, wherein switching further comprises: establishing a new telephone call from the first telephone terminal to the second telephone terminal using the mobile telephone communication technique, thereby causing the second telephone terminal to respond to the new telephone call automatically to switch the voice conversation thereto from a current radio communication between the first telephone terminal and the second telephone terminal using the push to talk communication technique.

6. The method according to claim 3, wherein, when the current communication technique is the mobile telephone communication technique, said monitoring comprises:

monitoring a first signal strength of the connection of the first telephone terminal with the mobile telephone network, and monitoring a second signal strength of the connection of the second telephone terminal with the mobile telephone network; and the switching comprises:

detecting a first position of the first telephone terminal, detecting a second position of the second telephone terminal;

calculating a distance between the first position and the second position.

7. The method according to claim 3, wherein when the current communication technique is the push to talk communication technique said monitoring comprises:

monitoring a first position of the first telephone terminal, monitoring a second position of the second telephone terminal, and monitoring a distance corresponding to the distance between the first position and the second position; and the switching further comprises:

detecting a first signal strength of the connection of the first telephone terminal with the mobile telephone network, and detecting a second signal strength of the connection of the second telephone terminal with the mobile telephone network; and determining whether a distance trend corresponding to a calculated distance between the first position and the second position is within a transmission range of the at least one alternative communication technique present on both the first and second telephone terminals.

8. The method according to claim 3, comprising:

submitting, with the first phone terminal, an availability request of the second telephone terminal from the first telephone terminal to a server computing system in response to the establishing of the voice conversation, and enabling said monitoring and said switching in response to a positive response to the availability request received from the server computing system.

9. The method according to claim 6, comprising:

downloading status information comprising an indication of the second signal strength and of the second position from a server computing system, wherein the status information has been uploaded from the second telephone terminal.

10. The method according to claim 3, wherein, when the current communication technique is the mobile telephone communication technique, said monitoring comprises:

monitoring a first signal strength of the connection of the first telephone terminal with the mobile telephone network; and the switching further comprises:

attempting to establish a new radio communication from the first telephone terminal to the second telephone terminal, and switching the voice conversation from the mobile telephone communication technique to the push to talk communication technique in response to an acknowledgment sent by the second telephone terminal indicating that the new radio communication is available.

11. The method according to claim 3, wherein when the current communication technique is the push to talk communication technique said monitoring comprises: monitoring a radio strength of an incoming radio communication received by the first telephone terminal from the second telephone terminal, and the switching further comprises:

attempting, using the first telephone terminal, a new telephone call from the first telephone terminal to the second telephone terminal, and switching the voice conversation from the push to talk communication technique to the mobile telephone communication technique in response to an indication of acceptance of the new telephone call by the second telephone terminal.

12. The method according to claim 3, further comprising:

transmitting, in response to the establishing of the voice conversation using the mobile telephone communication technique, an indication of a push to talk identifier of the first telephone terminal from the first telephone terminal to the second telephone terminal using the mobile telephone communication technique to cause the second telephone terminal to store the push to talk identifier.

13. The method according to claim 4 comprising:

transmitting, in response to the establishing of the voice conversation using the push to talk communication technique, an indication of a telephone number of the first telephone terminal from the first telephone terminal to the second telephone terminal using the push to talk communication technique to cause the second telephone terminal to store the telephone number.

14. The method according to claim 1, further comprising: monitoring one or more quality indicators of a previously used communication technique, and switching the voice conversation from a selected communication technique to the previously used communication technique in response to a restore condition based on the one or more quality indicators of the previously used communication technique.

15. A system for managing voice conversations, the system comprising:

a computing device configured to:

establish a voice conversation between a first user of a first telephone terminal and a second user of a second telephone terminal by using a current communication technique of a plurality of communication techniques supported by the first telephone terminal and the second telephone terminal, monitor one or more quality indicators of the current communication technique;

switch the voice conversation from the current communication technique to a selected one alternative of the plurality of communication techniques different from the current communication technique in response to a switching condition based on the device detecting one or more quality indicators of the current communication technique and on one or more quality indicators of each alternative of the plurality of communication techniques, wherein at least one of the one or more quality indicators corresponds to a distance between the first telephone terminal and the second telephone terminal, a distance trend corresponding to a change in distance between the first telephone terminal and the second telephone terminal over time, and a transmission range of both the current communication technique and of the selected one alternative communication technique present on both the first and second telephone terminals; and verify the switching condition according to a risk of interruption of the voice conversation based on a trend of the one or more quality indicators relating to a signal strength of the current communication technique and a trend of the one or more quality indicators relating to a rate of change of distance between the first and second telephone terminals, and on a possibility of establishing the voice conversation using the selected one alternative communication technique.

16. The system according to claim 15, wherein the computing device is further configured to:
   verify the switching condition according to a risk of interruption of the voice conversation based on a trend of the one or more quality indicators of the current communication technique and on a possibility of establishing the voice conversation using the selected one alternative of the plurality of communication techniques.

17. The system according to claim 15, wherein the computing device is further configured to:
   start a new communication with the selected one alternative of the plurality of communication techniques for implementing the voice conversation, and
   drop a current communication with the current communication technique implementing the voice conversation after a predefined delay from the starting of the new communication.

18. A telephone terminal comprising:
   circuitry for establishing a voice conversation between a user of the telephone terminal and a user of a second telephone terminal using one of a plurality of communication techniques supported by the telephone terminal and the second telephone terminal;
   circuitry for monitoring one or more quality indicators of a current communication technique of the plurality of communication techniques;
   circuitry for switching the voice conversation from the current communication technique to a selected alternative of the plurality of communication techniques in response to a switching condition based on the one or more quality indicators of the current communication technique and on one or more quality indicators for each one of the plurality of communication techniques, wherein at least one of the one or more quality indicators corresponds to a distance between the first telephone terminal and the second telephone terminal, a distance trend corresponding to a change in distance between the first telephone terminal and the second telephone terminal over time, and a transmission range of both the current communication technique and of the selected alternative communication technique of the plurality of communication techniques present on both the first and second telephone terminals; and
   circuitry for verifying the switching condition according to a risk of interruption of the voice conversation based on a trend of the one or more quality indicators relating to a signal strength of the current communication technique and a trend of the one or more quality indicators relating to a rate of change of distance between the first and second telephone terminals, and on a possibility of establishing the voice conversation using the selected alternative communication technique.

19. The method according to claim 1, wherein said switching comprises:
   verifying the switching condition according to a risk of interruption of the voice conversation based on a trend of the one or more quality indicators of the plurality of communication techniques and on a possibility of establishing the voice conversation using each of the plurality of communication techniques according to the one or more quality indicators associated with each of the plurality of communication techniques.

* * * * *